(12) United States Patent
Kuehl et al.

(10) Patent No.: US 7,943,891 B2
(45) Date of Patent: May 17, 2011

(54) METHOD AND RECEIVER FOR THE SIMULTANEOUS DETECTION AND EVALUATION OF AT LEAST TWO ELECTRO-MAGNETIC SIGNALS

(75) Inventors: Christopher Kuehl, Munich (DE); Markus Melf, Reichersbeuern (DE)

(73) Assignee: EADS Astrium GmbH, Munich (DE)

( * ) Notice: Subject to any disclaimer, the term of this patent is extended or adjusted under 35 U.S.C. 154(b) by 1327 days.

(21) Appl. No.: 10/554,102

(22) PCT Filed: Apr. 22, 2004

(86) PCT No.: PCT/DE2004/000853
§ 371 (c)(1),
(2), (4) Date: Jul. 26, 2006

(87) PCT Pub. No.: WO2004/094232
PCT Pub. Date: Nov. 4, 2004

(65) Prior Publication Data
US 2007/0065786 A1  Mar. 22, 2007

(30) Foreign Application Priority Data
Apr. 24, 2003 (DE) ................................. 103 18 580

(51) Int. Cl.
*H01L 27/00* (2006.01)

(52) U.S. Cl. ................................. 250/208.1; 250/214.1
(58) Field of Classification Search .................. 250/221, 250/203.1–203.6, 214.1, 208.1, 226; 356/310–328, 356/4.04–4.06; 359/559–565
See application file for complete search history.

(56) References Cited

U.S. PATENT DOCUMENTS

| 3,781,552 A | 12/1973 | Kadrmas |
| 5,479,258 A * | 12/1995 | Hinnrichs et al. ............ 356/326 |
| 2002/0121574 A1 | 9/2002 | Davis |

FOREIGN PATENT DOCUMENTS

| DE | 37 17 906 A1 | 12/1988 |
| DE | 40 30 344 A1 | 4/1992 |
| DE | 42 17 430 A1 | 12/1993 |
| DE | 195 04 039 C1 | 4/1996 |
| DE | 198 23 358 A1 | 11/1999 |
| DE | 198 46 690 A1 | 4/2000 |
| DE | 198 47 480 A1 | 4/2000 |

* cited by examiner

*Primary Examiner* — Que T Le
(74) *Attorney, Agent, or Firm* — Crowell & Moring LLP

(57) ABSTRACT

In a method and apparatus for simultaneous detection and analysis of at least two electromagnetic signals, at least one of which is a radiation image signal, using a common detector, the input radiation image is divided into at least two partial images. The partial images are projected onto a radiation detector, such that the radiation intensities of the partial images are projected from the image center of the input radiation image to the edge of the radiation image on the detector.

13 Claims, 5 Drawing Sheets

METHOD AND RECEIVER FOR THE SIMULTANEOUS DETECTION AND EVALUATION OF AT LEAST TWO ELECTRO-MAGNETIC SIGNALS

BACKGROUND AND SUMMARY OF THE INVENTION

This application claims the priority of German patent document 103 18 580.1, filed Apr. 24, 2003 (PCT International Application No. PCT/DE2004/000853, filed Apr. 22, 2004), the disclosure of which is expressly incorporated by reference herein.

The present invention relates to a method and apparatus for simultaneous detection and analysis of at least two electromagnetic signals, such as may be used in a spacecraft, in particular.

The term spacecraft in the sense of the invention includes all artificial bodies designed for use in outer space, including satellites, space probes, space shuttles, space stations or rockets. However, in principle, the method and apparatus can also be used for terrestrial applications. The term receivers in the sense of the invention includes all devices which are designed to receive and process electromagnetic radiation, for example, for the purpose of the data exchange between spacecraft, or between the spacecraft and earth stations, or between other objects, or also for the purpose of the detection, locating, measuring and/or observation of objects emitting electromagnetic radiation. Signals in the sense of the invention are represented by any type of electromagnetic radiation which can be detected by a receiver according to the invention, thus including radiation actively emitted by an object as well as passively scattered or reflected by an object.

German patent document DE 198 46 690 A1 discloses an optical receiver system which is constructed in the form of a combined earth-star sensor, and is used for observing the earth and the stars. From the obtained information, a three-axis attitude and position determination of satellites is permitted.

An optical receiver system for optical intersatellite connections is disclosed and described in detail in German Patent Document DE 198 47 480 A1. Such intersatellite connections are used for exchanging data between individual satellites, but can also be used to determine the attitude of a satellite, as in the case of German Patent Document DE 198 47 480 A1.

However, a problem arises in the case of arrangements from the state of the art when two or more electromagnetic signals that are to be detected simultaneously are mutually superimposed on a common detector. Here, it must be possible nevertheless to separate the individual electromagnetic signals sufficiently to permit a clear identification of the individual electromagnetic signals. Another problem is that a distortion of detected radiation images often occurs in the area outside the optical axis of the receiver. This is especially important when one of the electromagnetic signals must be determined with a particularly high precision. The state of the art offers no satisfactory solution for this purpose.

It is therefore an object of the invention to provide a method and a receiver apparatus for simultaneous detection and analysis of at least two electromagnetic signals, which eliminates the disadvantages of the state of the art.

This and other objects and advantages are achieved by the method according to the invention, which comprises the following steps:

Division of an input radiation image into at least two partial images

Projection of the partial images on a radiation detector; and imaging the partial images on the radiation detector in such a manner that radiation intensities of the partial images are projected from the image center of the input radiation image to the edge of the radiation image on the detector.

In this case, a planar expanded electromagnetic radiation signal is considered to be the radiation image signal, which radiation signal appears as an image and not only as in a largely punctiform shape when it is projected on the detector.

The advantage of the method according to the invention lies in the fact that the radiation image, which as an expanded radiation signal is less susceptible to distortions, is displaced into edge areas, so that the area around the optical axis can be utilized for the—simultaneous—detection of less expanded signals, in a more precise manner. This applies particularly if, in addition to the radiation image, the exact position of another signal of a smaller expansion is to be detected. In addition, mutual interference of the signals that are to be simultaneously detected can be avoided (or at least diminished) as a result of the displacement of the radiation intensities of the partial images into the edge area. This is particularly applicable when the radiation intensities of the radiation image are approximately equally to or even greater than the radiation intensity of the at least one other signal. The detector surface can also be used more effectively by the displacement of the radiation intensities from the image center of the radiation image into the edge area.

The projection of the radiation intensities of the partial images from the image center of the input radiation image to the edge of the radiation image can take place in particular if the partial images of the input radiation image are reflected. However, as an alternative, it can also be provided that the partial images of the input radiation image are displaced in the direction of the image edge.

The division of the input radiation image can take place into any suitable number and shape of partial images which permit the displacement of the radiation intensities from the image center of the input radiation image to the edge of the radiation image. Thus, in the case of a square input radiation image, the input radiation image can be divided into four partial images, with imaging of the partial images such that radiation intensities are projected from the image center of the input radiation image in the direction of a corner of the radiation image on the detector. However, a division into only two partial images or into a larger number of partial images is also possible.

In principle, the method according to the invention can be used for all suitable types of electromagnetic signals, one of which is a radiation image signal. Thus, for example, a data communication signal can be detected as one of the electromagnetic signals, for example, in addition to a radiation image signal. A usage for this purpose can take place, for example, within the scope of data connections between objects, such as particularly spacecraft or the like. For this purpose, reference is also made to the statements in the introduction to the specification.

In a special application of the present method, it may be provided that radiation images of reference objects, particularly celestial bodies, are detected as radiation image signals. This can be provided particularly when an identification or position determination of certain reference objects, such as particularly celestial bodies, is to take place. The information thus obtained can be used, for example, to determine position and/or attitude information relative to the corresponding reference object. However, in addition to the detection of one or more reference objects, other electromagnetic signals, such as those of largely punctiform signal sources can also be detected. The latter may be used, for example, to obtain additional position information and/or attitude information, and also, for example, for the data communication.

In a special embodiment of the above-mentioned method, which is used particularly for spacecraft, radiation images of the earth and the stars are detected simultaneously and the image of the earth is divided into partial images. As a result, it is possible to detect the, as a rule, largely punctiform electromagnetic signals (which usually have a lower intensity) in the optical axis of the detector and therefore largely without any distortion. This arrangement permits a precise position determination of the stars. In contrast, the more expanded (and, as a rule, higher-intensity) radiation image of the earth is displaced to the edge of the detector, into an area outside the optical axis of the detector. Thus, a detection of the earth and the stars is permitted with a greater precision than in the state of the art while the mutually influencing of the respective signals is simultaneously reduced.

Another feature of the present invention is the provision of a receiver having a device for simultaneous detection and analysis of at least two electromagnetic signals by a joint detector, at least one of which is a radiation image signal. According to the invention, at least one radiation image splitter is provided for dividing the input radiation image into at least two partial images and projecting them onto a radiation detector. The latter is designed such that the partial images are formed on the radiation detector with their radiation intensities projected from the image center of the input radiation image to the edge of the radiation image on the detector. Analogously, the advantages which were illustrated for the method according to the invention are obtained for the receiver according to the invention.

In particular, the radiation image splitter can be designed such that the partial images of the input radiation image are reflected. However, the radiation image splitter may also be designed in such a manner that the partial images of the input radiation image are displaced in the direction of the image edge.

In the case of a square input radiation image, the radiation image splitter can particularly be designed such that the input radiation image is divided into four partial images, whose radiation intensities are projected from the image center of the input radiation image in the direction of a corner of the radiation image on the detector.

The receiver can also be constructed as part of a data communication device. For this purpose, reference is made to the statements concerning the method according to the invention.

The receiver can also be designed as a sensor for the detection of radiation images of reference objects, such as celestial bodies. In this respect, reference is also made to the statements concerning the method according to the invention. A combination with another detection method of signals, for example, for the data communication, can also be provided in the case of the receiver according to the invention. The receiver may be designed, for example, as a combined earth-star sensor.

In principle, the receiver can be designed for any suitable wavelength or any suitable wavelength range. In particular, it can be provided that the receiver is designed as an optical receiver.

Other objects, advantages and novel features of the present invention will become apparent from the following detailed description of the invention when considered in conjunction with the accompanying drawings.

DETAILED DESCRIPTION OF THE DRAWINGS

Figure 1:
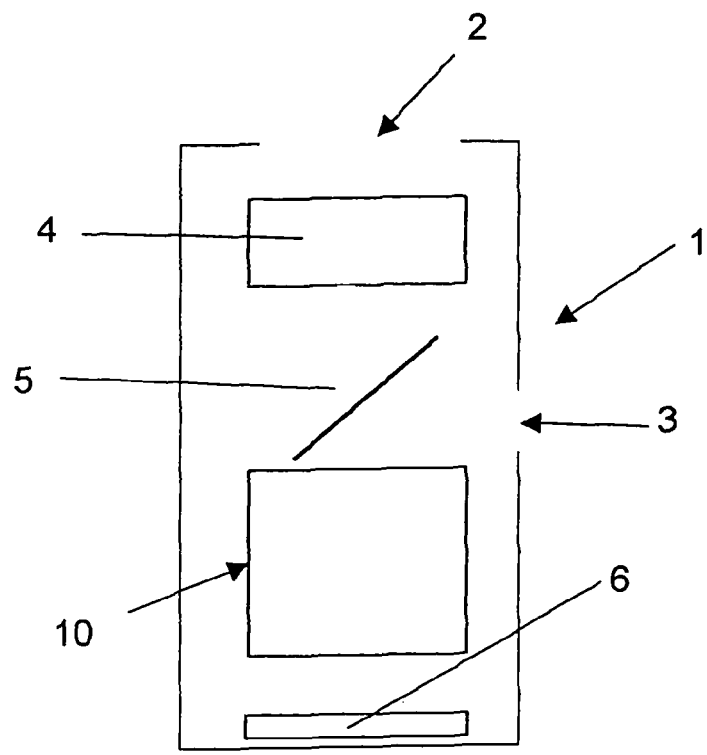
FIG. 1 is a schematic representation of an optical receiver according to the invention.

FIG. 1 is a purely schematic view of a special embodiment of an optical receiver 1 according to the invention, which has a first expanded aperture 2 for detecting an expanded optical radiation image signal, and a second aperture 3 for detecting less expanded optical signals. In the example according to FIG. 1, the two apertures 2, 3 are arranged perpendicular to one another. However, other arrangement of the apertures 2, 3 may also be suitable.

The radiation image signal entering through the aperture 2 is projected on an optical detector 6. The optical signal entering through the aperture 3 is projected on the detector 6, for example, by way of a mirror 5. (For the implementing or optimizing of the projection, a correspondingly constructed imaging lens system 10 can be provided.) The optical radiation image signal and the additional optical signal are then mutually superimposed on the detector 6. The mirror 5 may be semitransparent, in which case, the two optical signals can already be superimposed.

Figure 2:
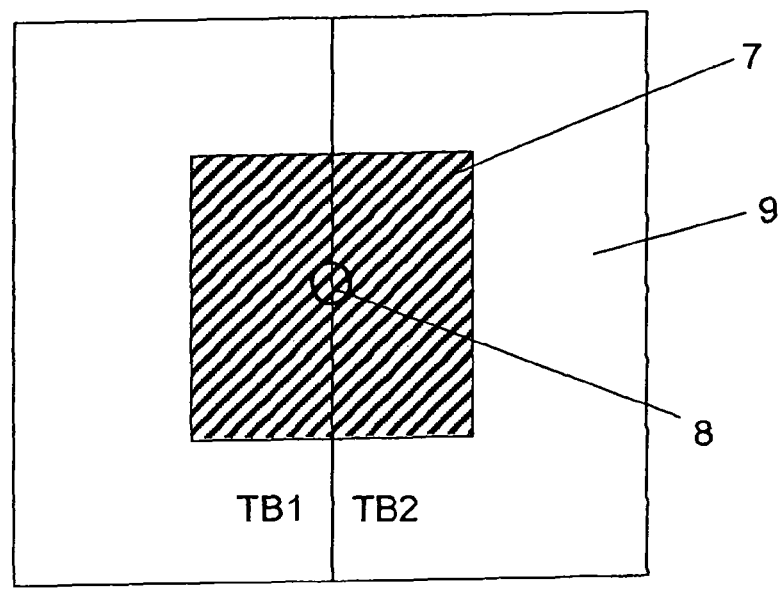
FIG. 2 is a schematic representation of the division of an input radiation image into partial images.

FIG. 2 shows the superposition of the two optical signals, as it would occur without any further influence on the radiation image signal. It is assumed that the input radiation image signal comprises a square optical image 9, which contains the optical image of a reference object 7. Furthermore, another (largely punctiform) signal 8 is assumed which was detected by the aperture 3. The additional, largely punctiform optical signal 8 would then normally be superimposed on the input radiation image signal 9, as illustrated in FIG. 2. Signal, 8 is imaged in the image center, and thus in the optical axis of the detector 6, in order to avoid distortions, if possible. However, in this case, the superpositioning of the optical image of the reference object 7 on the optical signal 8 makes it difficult to separate the optical signal 8 from that of the reference object 7.

To avoid this problem, the input radiation image 9 is divided into two partial images TB1 and TB2, before a superposition takes place with the additional optical signal. (The two partial images are already illustrated in FIG. 2.) For this purpose, a radiation image splitter 4 is provided in the optical receiver, as shown schematically in FIG. 1. However, a division can also take place into more than two partial images or into partial images having a different shape.

Figure 3:
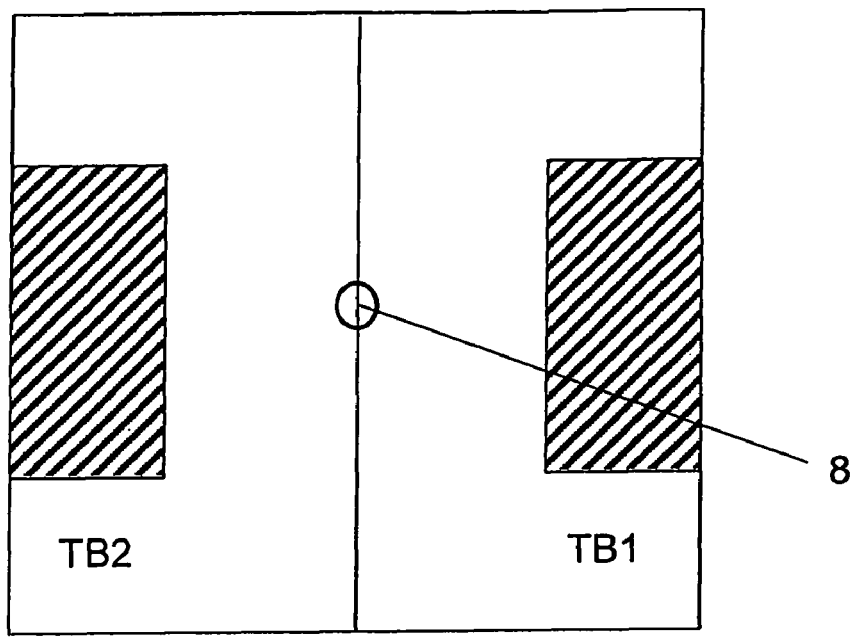
FIG. 3 is a schematic representation of the projection of displaced partial images on the detector.

The radiation image splitter can be designed such that the partial images TB1 and TB2 (the image parts of the reference object image 7) are displaced toward the image edge, that is with their radiation intensities displaced from the center of the radiation image 9 to the image edge, as is illustrated in FIG. 3. Only the optical signal 8 will now remain in the image center, and can now be detected without being influenced by the radiation image of the reference object 7. Also, the surface of the detector 6 is now utilized more effectively because its edge areas are also utilized for a signal detection.

Figure 4:
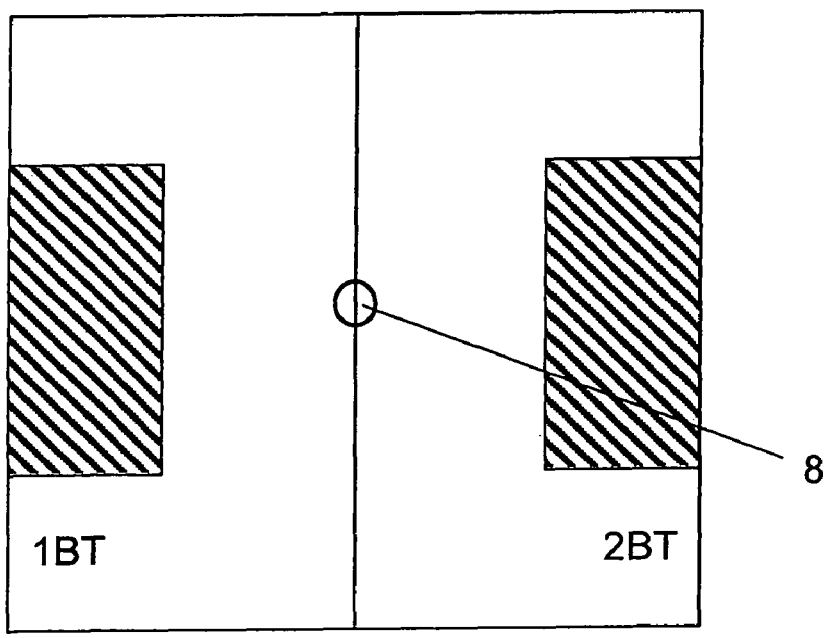
FIG. 4 is a schematic representation of the projection of reflected partial images on the detector.

FIG. 4 illustrates an alternative to FIG. 3, in which no displacement but a suitable reflection of the partial images TB1, TB2 takes place. As a result of this suitable reflection, the radiation intensities corresponding to the image parts of the reference object image 7 are again imaged away from the center of the radiation image 9, in the area of the image edge. As a result, as in the case of FIG. 3, the optical signal 8 can now be detected without being influenced by the radiation image of the reference object 7.

The additional optical signal 8 may represent, for example, an optical data communication signal, but also a largely punctiform reference signal of an artificial or natural radiation source, such as a star. Thus, either information within the scope of a data transmission can be obtained from the optical signal 8, or corresponding position or attitude information can be obtained concerning a position determination of the origin of the optical signal 8.

Figure 5:
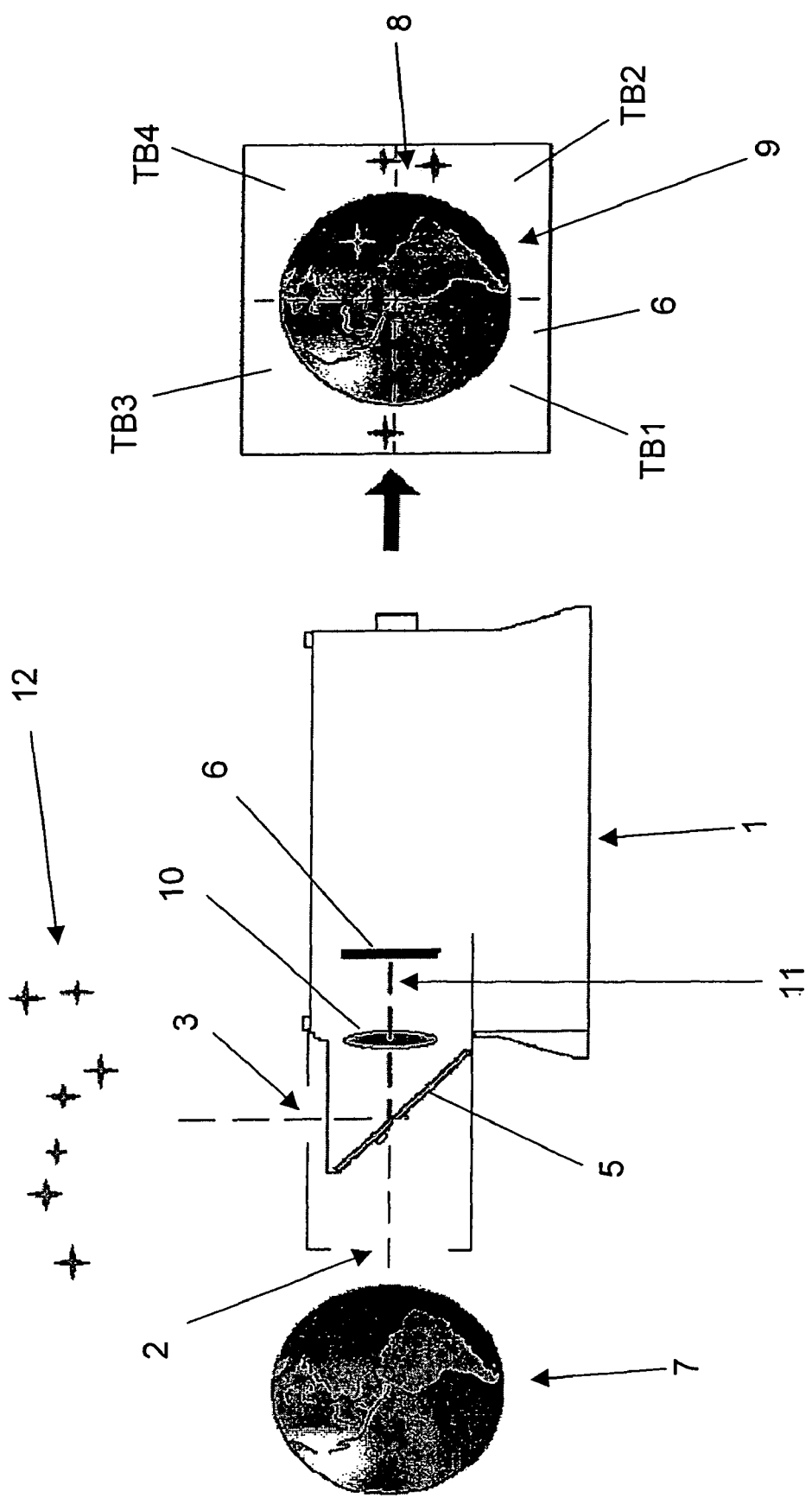
FIG. 5 is a representation corresponding to FIGS. 1 and 2 without a radiation image splitter for a combined earth-star sensor.

FIG. 5 illustrates a special embodiment of the optical receiver 1 of the above-mentioned example, in a combined earth-star sensor, which also has two apertures 2, 3. An arrangement 5, such as a semitransparent mirror, is provided for superpositioning two radiation image signals 8, 9 (the input radiation image 9 of the earth 7 and the radiation image signal 8 of selected stars 12). The two superimposed radiation image signals 8, 9 are then imaged on a detector 6 by a suitable lens system 10. In the case according to FIG. 5, the two radiation image signals 8, 9 would therefore be imposed on one another such that the optical signal 8 of the stars 12 would be superimposed on the optical input radiation image 9 of the reference object earth 7 directly in the optical axis 11 of the detector 6, as shown in FIG. 5 on the right. As a result, the signal 8 of the stars 12 could hardly be separated from the radiation image signal 9 of the earth 7, because of the higher radiation intensity of the radiation image signal of the earth 7.

Figure 6:
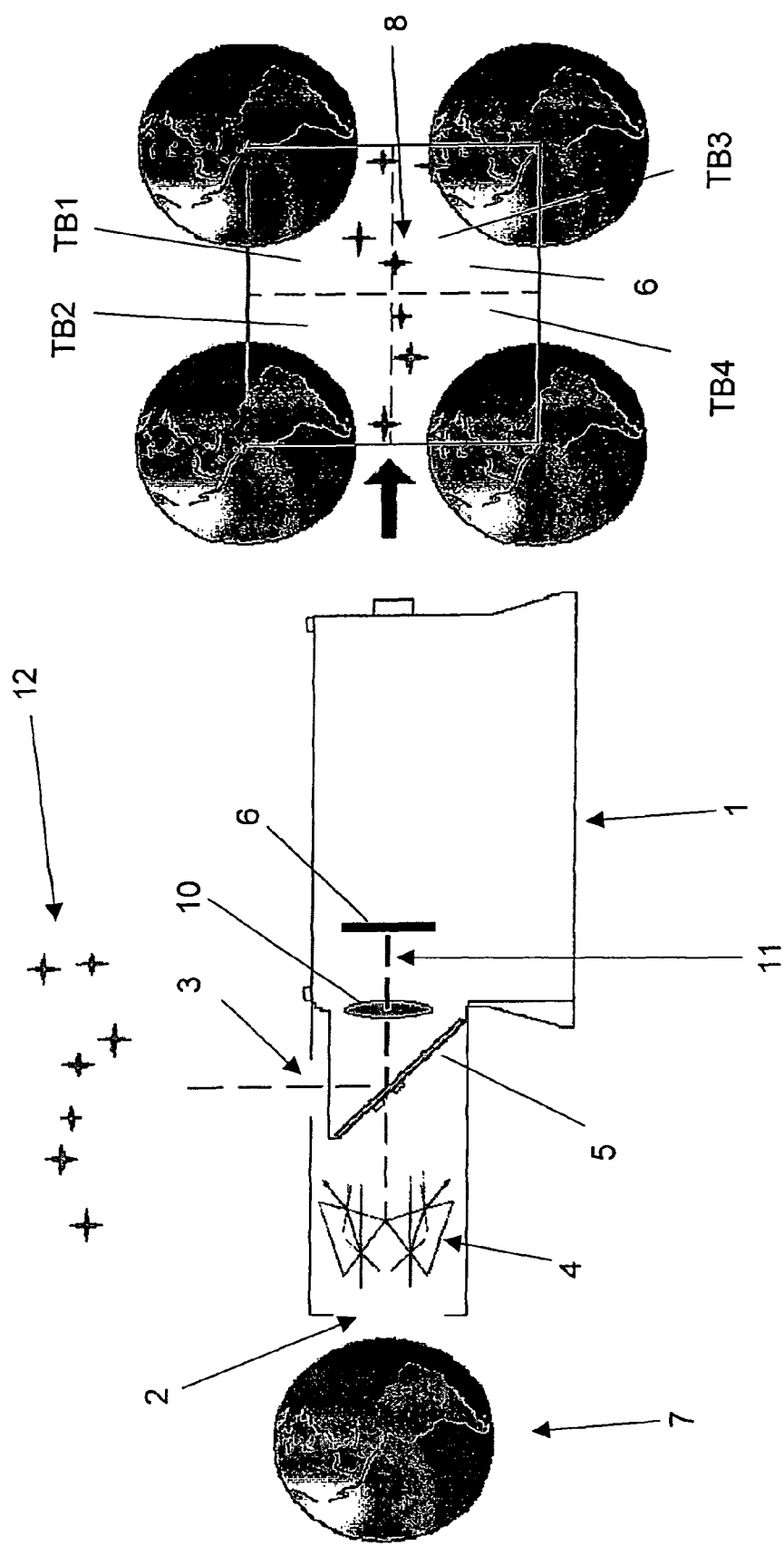
FIG. 6 is a representation corresponding to FIGS. 1 and 4 with a prism arrangement as a radiation image splitter for a combined earth-star sensor.
Figure 7:
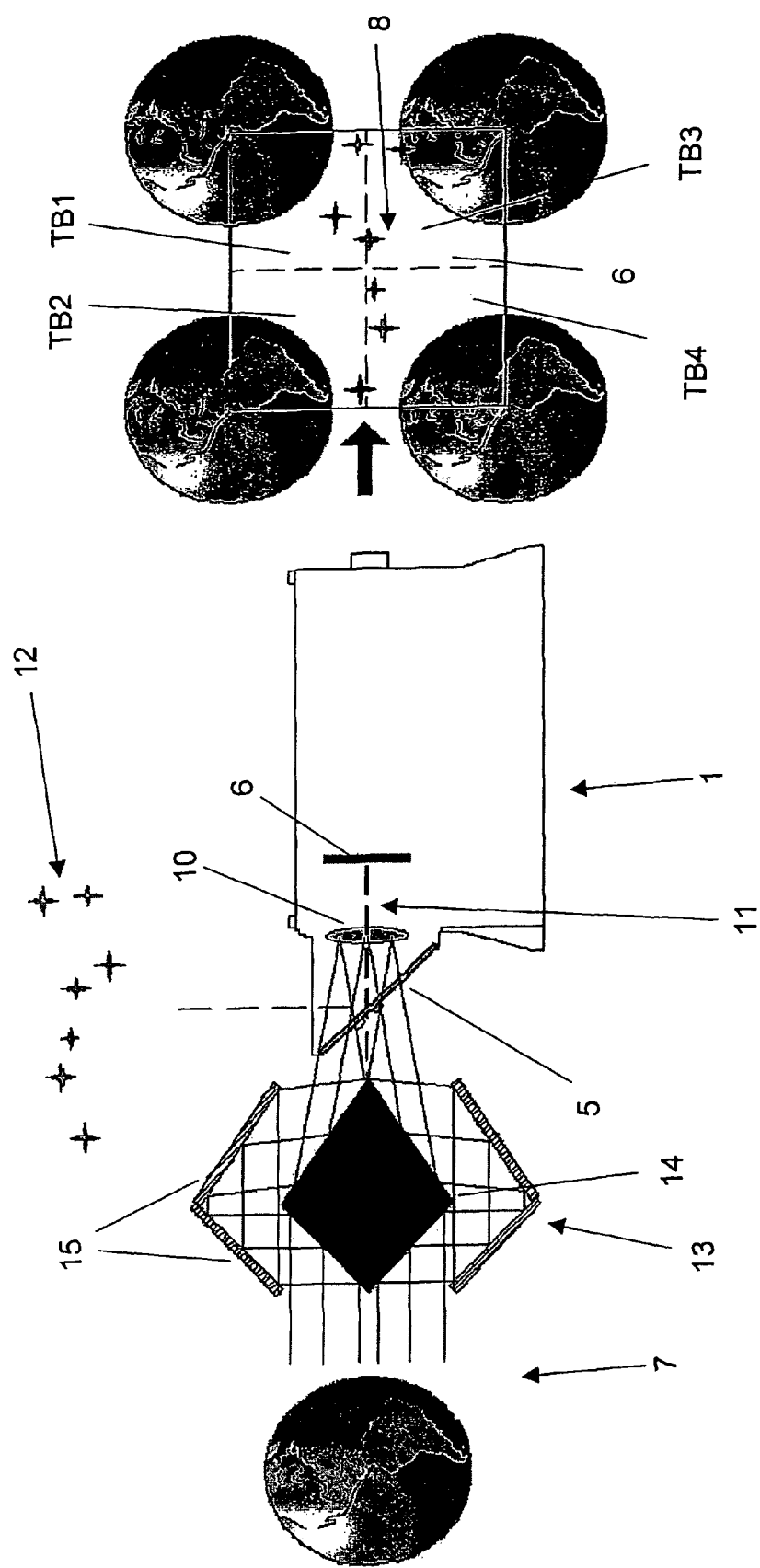
FIG. 7 is a representation corresponding to FIGS. 1 and 4 with a mirror arrangement as the radiation image splitter for a combined earth-star sensor.

To avoid this problem, four partial images TB1 to TB4 of the radiation image signal 9 of the earth 7 are generated, which are displaced to the edge of the radiation image 9, by optical imaging (for example, by means of prism arrangements or mirror arrangements), as illustrated in FIGS. 6 and 7.

FIG. 6 shows an example in which a prism arrangement is used. However, in selecting a suitable prism arrangement, it should be taken into account that an achromatic imaging of the radiation images takes place if the radiation images are not monochromatic radiation image signals. This problem can be avoided if, instead of a prism arrangement, a reflective arrangement, with appropriately arranged and appropriately shaped mirrors, is used, as illustrated in the manner of an example in FIG. 7.

In the example according to FIG. 6, a radiation image splitter 4 with a suitable prism arrangement is connected in front of the semitransparent mirror. The prism arrangement causes a quadruplication of the input radiation image 9 while simultaneously displacing the individual radiation images with respect to one another in the direction of the corners of the original input radiation image 9. In this case, only the displaced partial images TB1 to TB4 are detected in the corners on the detector 6 illustrated on the right in FIG. 6. In contrast, only the optical signal 8 of the stars 12 is imaged in the optical axis 11 of the detector. On the detector 6, the stars 12 have a much smaller expansion and therefore appear largely in a punctiform shape. By means of the arrangement according to FIG. 6, it is ensured that the position of the stars 12 can be detected largely without distortions and without interference from the radiation image of the earth 7. As a result, more precise position and attitude information for the earth-star sensor can be obtained with respect to the earth 7 and the stars 12.

The arrangement according to FIG. 7 corresponds largely to the arrangement according to FIG. 6. (For a simplification and better clarity of the representation, the apertures 2, 3, which would also have to be provided here corresponding to FIG. 6 are not shown in FIG. 7.) In the example according to FIG. 7, the prism arrangement 4 was replaced by a mirror arrangement 13 which consists of a central metal-coated body 14 and several planar mirrors 15 which partially surround the body 14 but leave open at least a beam path for the entry and exiting of the radiation image from the mirror arrangement 13. By using such a mirror arrangement 13, arbitrary radiation images can be detected independently of their spectral composition.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for simultaneous detection of at least two electromagnetic signals which are projected onto a common detector, at least one of the electromagnetic signals comprising a radiation image, said method comprising:
   dividing said radiation image into at least two partial images, each partial image containing a different spatial area of said radiation image;
   projecting the partial images onto a radiation detector; wherein,
   in said projecting step, the partial images are projected onto said radiation detector at respective locations that are displaced from an image center of the radiation image to an edge portion of the radiation image on the detector.

2. The method according to claim 1, wherein the partial images of the input radiation image are reflected.

3. The method according to claim 1, wherein, for the case of a square input radiation image:
   the radiation image is divided into four partial images; and
   the partial images are projected at locations that are displaced from the image center of the radiation image, in the direction of a corner of the radiation image on the detector.

4. The method according to claim 3, wherein one of the electromagnetic signals comprises a data communication signal.

5. The method according to claim 4, wherein radiation images of celestial bodies are detected as reference objects.

6. The method according to claim 5, wherein:
   radiation images of the earth and stars are detected simultaneously; and
   the radiation image of the earth is divided into partial images.

7. A receiver having a device for the simultaneous detection of at least two electromagnetic signals, at least one of which comprises a radiation image; said receiver comprising:
   a radiation detector; and
   at least one radiation image splitter for dividing said radiation image into at least two partial images and projecting the partial images onto the radiation detector; wherein,
   each partial image contains a different spatial area of said radiation image;
   said splitter is designed such that each partial image is projected onto said radiation detector at a different location that is displaced from an image center of the radiation image to an edge portion of the radiation image on the detector.

8. The receiver according to claim 7, wherein the partial images of the input radiation image are reflected.

9. The receiver according to claim 7, wherein:

in the case of a square input radiation image, the radiation image splitter divides the input radiation image into four spatially defined partial images; and radiation intensity patterns of the partial images are projected at locations that are displaced from the image center of the radiation image, toward a corner of the radiation image on the detector.

10. The receiver according to claim 9, wherein the receiver forms part of a data communication device.

11. The receiver according to claim 10, wherein the receiver is a sensor for detection of radiation images of celestial bodies as reference objects.

12. The receiver according to claim 11, wherein the receiver is an optical receiver.

13. The receiver according to claim 12, wherein the receiver is a combined earth-star sensor.

* * * * *